United States Patent [19]
Schmitt

[11] Patent Number: 5,000,520
[45] Date of Patent: Mar. 19, 1991

[54] SWITCHING ARRANGEMENT FOR THE CONTROL OF THE HYDRAULIC PUMP OF THE AUXILIARY PRESSURE SUPPLY SYSTEM OF AN AUTOMOTIVE BRAKE SYSTEM

[75] Inventor: Albrecht Schmitt, Weiterstadt, Fed. Rep. of Germany

[73] Assignee: Alfred Teves GmbH, Frankfurt am Main, Fed. Rep. of Germany

[21] Appl. No.: 413,802

[22] Filed: Sep. 28, 1989

[30] Foreign Application Priority Data
Oct. 1, 1988 [DE] Fed. Rep. of Germany ....... 3833473

[51] Int. Cl.$^5$ .................. B60T 13/20; B60T 13/66; B60T 17/22; B60T 8/32
[52] U.S. Cl. .................................... 303/10; 303/116; 303/DIG. 3
[58] Field of Search .................. 303/10–12, 303/92, DIG. 5, 1–4, 100, 116, 113, 114, 65; 60/545; 188/355, 358

[56] References Cited

U.S. PATENT DOCUMENTS

| 3,516,715 | 6/1970 | Fielek et al. | |
| 3,907,378 | 9/1975 | Leiber | 303/92 |
| 4,357,054 | 11/1982 | Leiber | 303/10 |
| 4,402,554 | 9/1983 | Belart | 303/10 |
| 4,421,361 | 12/1983 | Arikawa et al. | 303/92 |
| 4,699,435 | 10/1987 | Wupper | 303/11 |
| 4,728,156 | 3/1988 | Burgdorf et al. | 303/DIG. 4 |
| 4,802,710 | 2/1989 | Burgdorf et al. | 303/92 X |
| 4,848,847 | 7/1989 | Reinartz et al. | 303/11 |

FOREIGN PATENT DOCUMENTS

| 1961039 | 6/1971 | Fed. Rep. of Germany. | |
| 3227265 | 1/1984 | Fed. Rep. of Germany. | |
| 3443880 | 6/1985 | Fed. Rep. of Germany. | |
| 3418042 | 11/1985 | Fed. Rep. of Germany. | |
| 2158905 | 11/1985 | United Kingdom | 303/DIG. 4 |
| 2168017 | 6/1986 | United Kingdom. | |

Primary Examiner—Douglas C. Butler
Attorney, Agent, or Firm—Robert P. Seitter; J. Gordon Lewis

[57] ABSTRACT

A switching arrangement for the control of the motor (1) a hydraulic pump (2) in an auxiliary pressure supply system of a brake system. A motor relay (9) is provided which is controlled by the switching control (8) of a pressure switch (7) and actuates an operating contact (11) through the intermediary of which the motor (1) is connectible to the source of current ($_{Batt}+^U$). In the event of an auxiliary pressure drop to the lower limit, the pressure switch (7) responds. If the pressure rises up to an upper limit, the switching contact (8) is opened again. A switching contact (13) is provided which closes in the event of a pressure drop to a pressure minimum and activates a brake warning lamp (15). An auxiliary motor relay (16) is inserted in parallel to the lamp whose operating contact (18) switches the pump motor (1) on even if, for example, the pressure switch (7) fails. The auxiliary motor relay (16) is released again as soon as the auxiliary pressure has exceeded the pressure minimum and has again risen to an auxiliary pressure which is still below the lower limit.

3 Claims, 1 Drawing Sheet

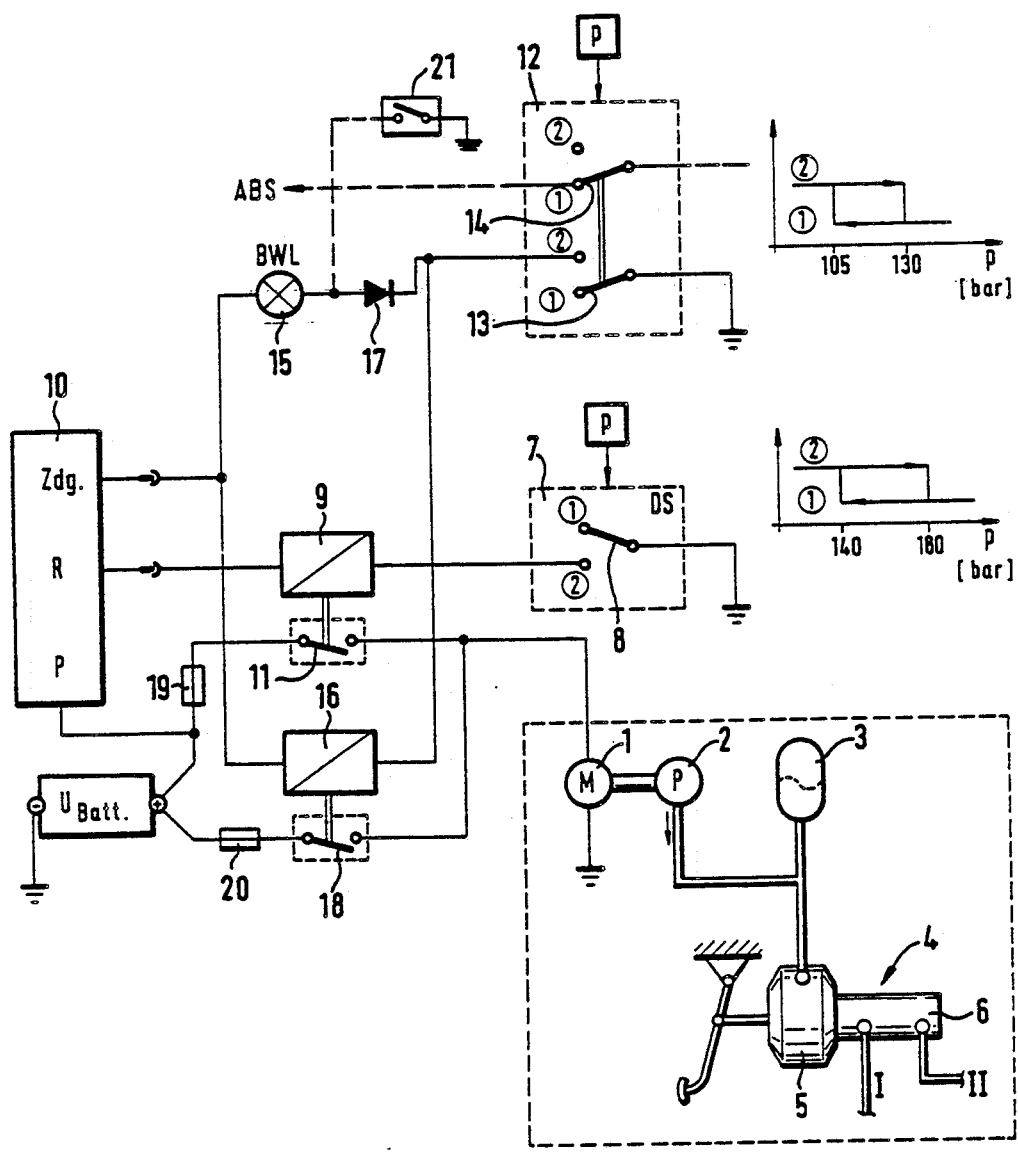

SWITCHING ARRANGEMENT FOR THE CONTROL OF THE HYDRAULIC PUMP OF THE AUXILIARY PRESSURE SUPPLY SYSTEM OF AN AUTOMOTIVE BRAKE SYSTEM

BACKGROUND OF THE INVENTION

The present invention relates to a switching arrangement for the control of the electric motor of a hydraulic pump which forms part of the auxiliary pressure supply system of an automotive brake system. The arrangement includes a pressure switch which closes a switching contact in the feed circuit of a motor relay whose operating contact switches the pump motor if the auxiliary pressure drops to a lower limit and opens if the auxiliary pressure rises to an upper limit. An additional switching contact is provided which responds in order to release a warning signal if the auxiliary pressure falls short of the pressure minimum and opens if the auxiliary pressure rises to a limit which is below the switching thresholds of the pressure switch.

A known brake system with a hydraulic booster and an anti-lock control system of this type has an auxiliary pressure supply system which comprises a hydraulic pump with electric motor drive and a pressure accumulator. In operation, the auxiliary pressure can vary within given limits of, for example, within 140 and 180 bar. The hydraulic pump is switched on as soon as the auxiliary pressure drops to the lower limit and remains in operation until the upper limit is reached. If, for example, due to a defect, the auxiliary pressure drops below the lower limit and reaches an auxiliary pressure minimum, which is set to 105 bar in the known brake system, a warning signal is provided. A brake warning lamp is switched on and the anti-lock control system is, if required, locked in part or completely so that the functioning of the brake without anti-lock control is not jeopardized. The warning signal is only discontinued and the locking brought to an end when the pressure has risen to a specific limit beyond the pressure minimum, with the limit still being below the lower limit of the operating range of the auxiliary pressure.

In the known brake system, the pump motor is switched on and off by means of the operating contact of a relay, a so-called motor relay. The exciting winding of the relay is also switched by means of a mechanical contact of a pressure switch. Mechanical switches of this type are comparatively susceptible to wear. The contacts can weld together or burn down in the event of specific defects within the system since in that type of systems, as is generally known, relatively high cut-in and cut-off currents can occur. In pump motors of this type in-rush currents of up to 50 ampere can be measured. The energies accumulated in the relay coil and in the motor windings produce high cut-off spikes in the respective branches. Furthermore, some contact defects only become apparent when the accumulator pressure is used up or after the continuously running pump motor has become defective.

SUMMARY OF THE INVENTION

It is therefore an object of the present invention to overcome these disadvantages with little additional expense, to increase the reliability of the brake system and to signal defects in the energy supply system at an early stage.

This object is achieved by means of a switching arrangement of the type described, whose particularity and improvement is that an auxiliary motor relay is provided which is excitable by way of the switching contact serving to release the warning signal and by way of the ignition lock of the automotive engine, and which comprises an operating contact through the intermediary of which the pump motor is connectable to the vehicle battery.

By means of this measure, a considerable increase in operational reliability is achieved at only little additional expense. The additional expense is in the cost for an additional relay which is similar to the existing motor relay. In contrast to the motor relay, the auxiliary relay rarely is switched under load, as long as all components work properly, so that it is substantially not susceptible to wear. If the auxiliary motor relay takes over the control of the pump, the driver is alerted by means of the existing brake warning lamp. In addition, the functioning of the brakes is maintained.

According to a particularly favorable embodiment of the present invention, the motor relay is connected to the vehicle battery in a first switch-on position of the ignition lock wherein only certain electrical loads, such as the radio, can be switched on, and the auxiliary motor relay is only connected when the ignition lock is in the driving position. By this means it is ensured that even after a considerable drop of the auxiliary pressure, first the motor relay will set the pump into operation so that even in this case the auxiliary motor relay will not be switched under load.

Expediently, a decoupling diode is inserted in a current path leading from the switching contact which serves to release the warning signal and to which the auxiliary motor relay is connected to a warning lamp which is connected to the vehicle battery by way of the ignition lock. By this means it is prevented that the auxiliary motor relay is excited by way of other switching contacts which also switch the warning lamp on, for example, by way of the hand brake contact.

BRIEF DESCRIPTION OF THE DRAWING

Further features, advantages and applications of the present invention will become apparent from the following detailed description of an embodiment taken in conjunction with the accompanying drawing in which the single figure illustrates a circuit diagram which shows the essential components of a switching arrangement according to the present invention in a simplified illustration.

DETAILED DESCRIPTION

The illustrated switching arrangement functions to control an electric motor 1 driving a hydraulic pump 2 which forms, together with a hydraulic accumulator 3, the auxiliary pressure supply system of a brake system. Here, a pedal-operated brake pressure generator 4 comprising a hydraulic booster 5 and a brake master cylinder 6, which wheel brakes (not illustrated) are connected by way of two brake circuits I, II, is outlined symbolically.

The switching arrangement for the control of the motor 1 comprises a pressure switch (DS) 7 with a switching contact 8 which is pressure-sensitively controlled. As is outlined symbolically, the switch is closed as soon as the pressure p has dropped to a lower limit of 140 bar. The switch is opened as soon as the upper limit of 180 bar has been reached. By way of switching contact 8, a motor relay 9 is connected to the positive pole of the motor vehicle ($_{Batt}+^U$), that is, by way of the ignition lock 10 of the motor vehicle. The connecting contact R was chosen, which symbolizes a switching position of the ignition lock in which selected electrical loads not including the ignition of the engine, are supplied with power. The radio is, among other loads, connected to the connection R. Normally, the steering lock snaps in the parking position P. In this switching position, only a few devices such as parking light, central locking system, etc. are still connected. The motor relay 9 carries an operating contact 11 which, as soon as it is closed, connects the pump motor 1 by way of a fuse 19 with the electric power source $_{Batt}+^U$.

A pressure warning switch 12 with two switching contacts 13, 14 coupled with one another also is illustrated. This switch also is controlled by means of the auxiliary pressure p. As is outlined symbolically, the switch responds in the event of a drop of the auxiliary pressure below the pressure minimum of 105 bar and is only restored to the depicted switching position when the pressure has again risen to 130 bar, that is, to a value which is still below the lower limit of 140 bar of the operating pressure range. The pressure warning switch thus signals a drop of the auxiliary pressure below the pressure minimum through the intermediary of a brake warning lamp (BWL) 15 which is connected to the battery $_{Batt}+^U$ by way of the switch-on position (Zdg) of the ignition lock 10. The second switching contact 14, which is normally closed, can be utilized, for example, to provide a signal to the brake slip control system that a sufficient auxiliary pressure is available. In known systems, the anti-lock control is locked by opening the contact 14.

An important feature of the present invention is the insertion of an additional motor relay, namely an auxiliary motor relay 16 whose exciting winding is connected in parallel with the brake warning lamp 15. A decoupling diode 17 connected in series with the lamp 15 prevents the relay 16 from being switched on by way of other switching contacts, for example by way of a hand brake contact 21; the lamp 15 also signals through the intermediary of the contact 21 that the hand brake is applied.

The auxiliary motor relay 16 is similar to the motor relay 11 and also carries an operating contact 18 through the intermediary of which the motor 1 of the pump 2 can be started even when the operating contact 11 of the relay 9 is open. Since the auxiliary motor relay 16 is connected to the operating contact 13 of the pressure warning switch 12, the hydraulic pump 2 is switched on by way of contact 13 in the event of a failure of the pressure switch 7 as soon as the auxiliary pressure minimum (105 bar) has been reached. At the same time, the warning lamp 15 flashes on. A failure of the motor relay 9, a defective contact 11, a blowing of the fuse 19 or the like is noted in the same manner. If the pressure now exceeds the upper response point and/or the point at which the pressure warning switch 12 goes out and if, furthermore, the pressure switch 7 remains open due to a defect and/or the current path by way of the fuse 19 and the contact 11 is interrupted, the motor 1 of the hydraulic pump 2 is again cut out at the pressure value of 130 bar which is still below the operating range of the auxiliary pressure. If pressure is consumed, the pressure must thus again drop below the pressure minimum which is signaled by means of a renewed flashing on of the brake warning lamp 15. The driver thus becomes aware of the defect when the lamp 15 flashes on and goes out. He can still drive the car without fearing an immediate failure of the brake system.

The auxiliary motor relay 16 is, in contrast to the motor relay 9, connected to the connection "Zdg" of the ignition lock 10, with the connection being only connected to the battery after the switching position R has been reached. Therefore, the motor 1 of the pump 2 is normally, as long as no defect occurs, always switched on by way of the relay 9. This applies also if the pressure accumulator 3 is discharged so as to fall below the pressure minimum of 105 bar, which usually is the case after a longer period of standstill of the vehicle, for example. The switching contact 18 of the auxiliary motor relay 16 thus remains unaffected by inrush currents which results in the fact that practically no wear occurs on this switch. Normally, the cutting out of the motor 1 is, at any rate, only controlled by the pressure switch 7 which only responds and/or re-opens when the upper limit of the auxiliary pressure of 180 bar has been reached.

Thus, according to the present invention, the reliability of the brake system is increased considerably by means of the insertion of a second, similar motor relay which serves as an auxiliary motor relay and only switches the pump motor 1 on and off in case of need and/or in the event of a failure.

What is claimed is:

1. A switching arrangement for the control of the electric motor of a hydraulic pump which forms part of the auxiliary pressure supply system of an automotive brake system, with a pressure switch which closes a switching contact in the feed circuit of a motor relay whose operating contact switches the motor of the pump if the auxiliary pressure drops to a lower limit and opens if the auxiliary pressure rises to an upper limit, with an additional switching contact which responds in order to provide a warning signal if the auxiliary pressure falls below the pressure minimum and opens if the auxiliary pressure rises to a limit which is below the switching thresholds of the pressure switch, wherein an auxiliary motor relay (16) is provided which is switched on by way of the switching contact (13) providing the warning signal and by way of the ignition lock (10) of the automotive engine, and which arrangement comprises an operating contact (18) through the intermediary of which the pump motor (1) is connectable to the vehicle battery ($_{Batt}+^U$).

2. A switching arrangement for the control of the electric motor of a hydraulic pump which forms part of the auxiliary pressure supply system of an automotive brake system, with a pressure switch which closes a switching contact in the feed circuit of a motor relay whose operating contact switches the motor of the pump if the auxiliary pressure drops to a lower limit and opens if the auxiliary pressure rises to an upper limit, with an additional switching contact which responds in order to provide a warning signal if the auxiliary pressure falls below the pressure minimum and opens if the auxiliary pressure rises to a limit which is below the switching thresholds of the pressure switch, wherein an auxiliary motor relay (16) is provided which is switched on by way of the switching contact (13) providing the warning signal and by way of the ignition lock (10) of the automotive engine, and which arrangement comprises an operating contact (18) through the intermediary of which the pump motor (1) is connectable to the vehicle battery ($_{Batt}+^U$), wherein the first-mentioned relay is a first motor relay (9) which is controlled by way of the pressure switch (7) is connectable to the vehicle battery ($_{Batt}+^U$) through a first switch-on position of the ignition lock (10) wherein only selected electrical loads are switched on, and the auxiliary relay is a second motor relay is only connectable to said battery when the ignition lock (10) is in the driving position of said ignition lock (10).

3. The switching arrangement according to claim 2, wherein a decoupling diode (17) is inserted in a current path leading from the switching contact (13) providing the warning signal and the auxiliary motor relay (16) to a warning lamp (15) which is connected to the vehicle battery by way of the ignition lock (10).

* * * * *